United States Patent [19]
Hasegawa

[11] Patent Number: 5,097,599
[45] Date of Patent: Mar. 24, 1992

[54] EMERGENCY ESCAPE TOOL
[75] Inventor: Yoshinobu Hasegawa, Seki, Japan
[73] Assignee: Hasegawa Hamono Kabushikikaisha, Seki, Japan
[21] Appl. No.: 625,015
[22] Filed: Dec. 10, 1990
[30] Foreign Application Priority Data
  Mar. 5, 1990 [JP] Japan .................. 2-54726
[51] Int. Cl.⁵ .............. B25F 3/00; B25F 7/22; B26F 1/00
[52] U.S. Cl. .................. 30/359; 30/123; 30/367; 7/135
[58] Field of Search ............ 30/123, 358, 367, 277, 30/359; 29/275, 271; 7/129, 132, 135, 158, 161

[56] References Cited
U.S. PATENT DOCUMENTS

| | | | |
|---|---|---|---|
| 389,553 | 9/1888 | Diefendorf | 7/135 |
| 652,429 | 6/1902 | Fulks | 7/135 |
| 1,110,969 | 9/1914 | Stacy | 30/367 |
| 1,145,082 | 7/1915 | Porter | 7/161 |
| 2,787,178 | 4/1957 | Maxim | 30/367 |
| 3,172,204 | 3/1965 | Frey | 30/367 |
| 4,268,927 | 5/1981 | Bridwell | 30/367 |

Primary Examiner—Douglas D. Watts
Assistant Examiner—Paul M. Heyrana, Sr.
Attorney, Agent, or Firm—Oblon, Spivak, McClelland, Maier & Neustadt

[57] ABSTRACT

An emergency escape tool is proposed for escaping from a car when an accident happens. Scissors for cutting a seat belt and a spike are provided. The spike is held at and retractably protrudes from a handle of the scissors. A tip of the spike is pressed against a window glass. A spike driver is housed in the handle. The spike driver usually urges the spike in the protruding direction. When the spike pressed against the window is displaced inwardly, the spike driver accumulates a compression force corresponding to the displacement. According to the accumulated compression force, the spike is promptly pressed toward the protruding direction so as to break the window glass.

10 Claims, 6 Drawing Sheets

EMERGENCY ESCAPE TOOL

This application claims the priority of Japanese Patent Application No. 2-54726 filed on Mar. 5, 1990, which is incorporated herein by reference.

BACKGROUND OF THE INVENTION

1. Field of the Invention

The present invention relates generally to an emergency escape tool. More particularly, the present invention relates to an emergency escape tool which is used, for example, for cutting a seat belt and breaking a car window to escape from a car when the car is accidentally submerged in water.

2. Description of the Related Art

In an emergency such as when a car is submerged in water, a seat belt needs to be cut so as to allow a driver or passengers to escape from the car. A pair of scissors may be used for this purpose.

In order to break a car window, a hammer may be used. However, a considerable amount of strength is required to break the window by means of the hammer. Thus, children and individuals who do not have enough physical strength may not be able to break the window even with the hammer. Even when a strong person tries to break the window, since there is a limited space in the car, it is often difficult to break the window with the hammer especially in the water.

In addition, it is also very difficult to cut the seat belt with the scissors and then to break the window with the hammer in that order in an emergency situation.

SUMMARY OF THE INVENTION

A primary object of the present invention is to provide an emergency escape tool which allows children or individuals having poor physical strength to cut a seat belt and to break a car window in an emergency situation in the water or the like.

Another object of the present invention is to provide an emergency escape tool which can cut the seat belt and can break the window in one grip, namely without replacing the tools nor gripping it more than once.

According to one aspect of the present invention, a pair of scissors or a cutter for cutting the seat belt are provided having a spike retractable protruding from the scissors or the cutter. An exposed end of the spike is to be pressed against a window glass. A driver for the spike is also provided. The driver accumulates a reactional force when the spike is retracted and drives the spike in the protruding direction according to the reactional force so as to break the window.

When a car is submerged in the water, for example, the scissors are used to cut the seat belt. Then the exposed end of the spike is brought into contact with the window glass in a right angle. The driver drives the spike to give a strong impulse to the window glass and breaks the window.

BRIEF DESCRIPTION OF THE DRAWINGS

The features of the present invention that are believed to be novel are set forth with particularity in the appended claims. The invention, together with the objects and advantages thereof, may best be understood by reference to the following description of the presently preferred embodiments together with the accompanying drawings in which:

DETAILED DESCRIPTION OF THE PREFERRED EMBODIMENT

Figure 1:
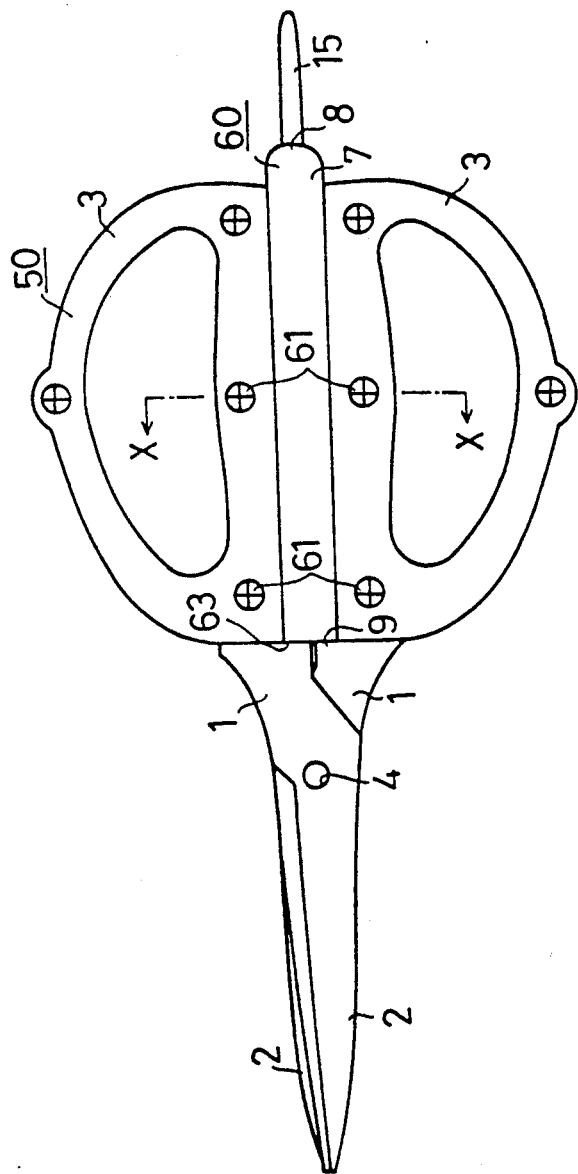
FIG. 1 is a plan view of an emergency escape tool of one embodiment of the present invention.

As illustrated in the drawings, a preferred embodiment of the present invention will be described in detail hereinafter.

Figure 2:
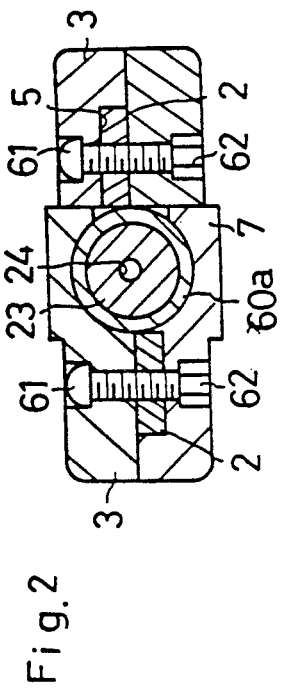
FIG. 2 is an enlarged sectional view taken along line X—X in FIG. 1.

As shown in FIG. 1, an emergency escape tool of the present embodiment has a pair of scissors 50 for cutting a seat belt and a punch 60 for breaking a car window. Each scissor arm 1 includes a blade 2 and a handle 3. The scissor arms 1 are connected together by means of a pivot 4 and can open and close. As shown in FIG. 2, a core of each blade 2 is inserted in a bore 5 at the handle 3 and is fixed to the handle 3 by means of a bolt 61 and a nut 62.

Between the scissor arms 1, one scissor arm 1 has a housing 7 formed integrally with the handle 3. The housing 7 extends in the longitudinal direction of the scissor arms 1. An opening 63 is formed at a proximal end (a left end in the drawing) of the housing 7. Another opening 8 having a diameter smaller than that of the opening 63 is formed at a distal end of the housing 7.

Figure 3:
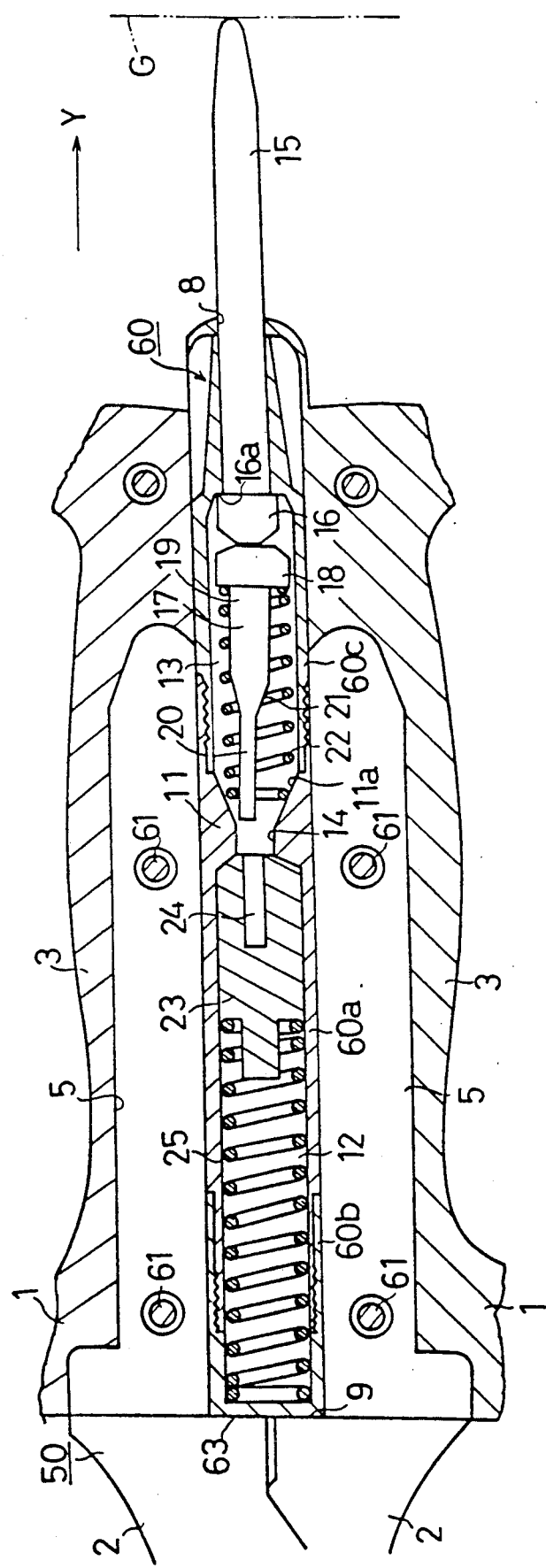
FIG. 3 is an enlarged plan sectional view of an inside of a punch.

A punch 60 is housed in the housing 7 by being led from the opening 63. As shown in FIG. 3, the punch 60 has a middle section 60a, and end sections 60b and 60c which are screwed to opposing ends of the section 60a.

A dividing wall 11 is formed inside the section 60a. Relative to the dividing wall 11, a proximal half (left in FIG. 3) of the section 60a is defined as a weight chamber 12, and a distal half (right in FIG. 3) of the section 60a is a pin chamber 13. A bore 14 is formed in the middle of the dividing wall 11 and communicates between chambers 12 and 13. The dividing wall 11 has a guide surface 11a at the pin chamber 13 side. The guide surface 11a diverges towards the distal end of the chamber 13.

A spike 15 is inserted in a distal end portion of the pin chamber 13 and can move inwardly and outwardly along the length of the punch 60. A tip of the spike 15 protrudes from the pin chamber 13 through the opening 8 of the housing 7. The spike 15 has a base 16 of a relatively large diameter at the proximal end thereof. The base 16 abuts on a step 16a formed at the inner wall of the section 60c so as to prevent the spike 15 from going out of the pin chamber 13. In a proximal portion of the pin chamber 13 relative to the spike 15, a pin 17 is housed. The pin 17 has a head 18 which is in contact with the base 16 of the spike 15. The pin 17 has a shank 19 having a smaller diameter than the head 18, and also has a shank 20 having a smaller diameter than the shank 19. The shank 19 is provided at the proximal end of the head 18, and the shank 20 is provided at the proximal end of the shank 19. The connecting portion between the shanks 19 and 20 defines a tapered surface 21.

A compression spring 22 is provided between the guide surface 11a of the pin chamber 13 and the head 18. The spike 15 is usually urged by means of the spring 22 so as to protrude the tip thereof out of the pin chamber 13. The pin 17 is arranged so as to extend in a direction a little oblique to an axial line of the punch 60 according to its weight balance.

A weight 23 is housed in the weight chamber 12 and can move in the longitudinal direction of the punch 60. A passage 24 is formed at an end surface, facing the chamber 13, of the weight 23. The passage 24 extends in the longitudinal direction of the punch 60. When the pin 17 is moved toward the distal end of the punch 60 along the axial line thereof against the urging force of the compression spring 22, the shank 20 can be inserted into the passage 24 by way of the bore 14.

The inner diameter of the passage 24 is sized to receive the shank 20. The bore 14 has an inner diameter larger than that of the passage 24. Accordingly, when the pin 17 is moved inwardly in the oblique posture, the shank 20 abuts on the circumference of the passage 24.

As shown in FIG. 3, the weight 23 is urged from the inner wall of the proximal end of the chamber 12 toward the distal end thereof by means of a compression spring 25. Therefore, the weight 23 is usually in contact with the dividing wall 11.

Figure 4:
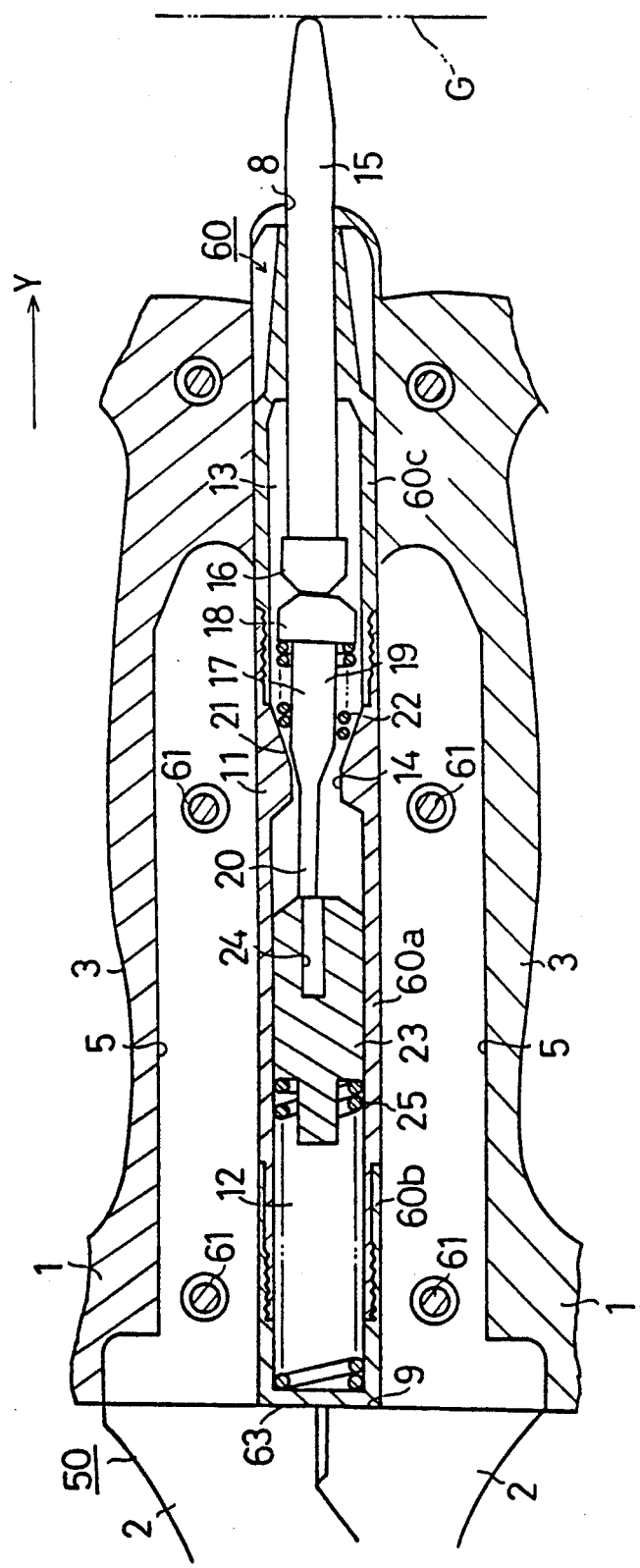
FIG. 4 is a plan sectional view of the emergency escape tool, showing one step of its operation.
Figure 6:
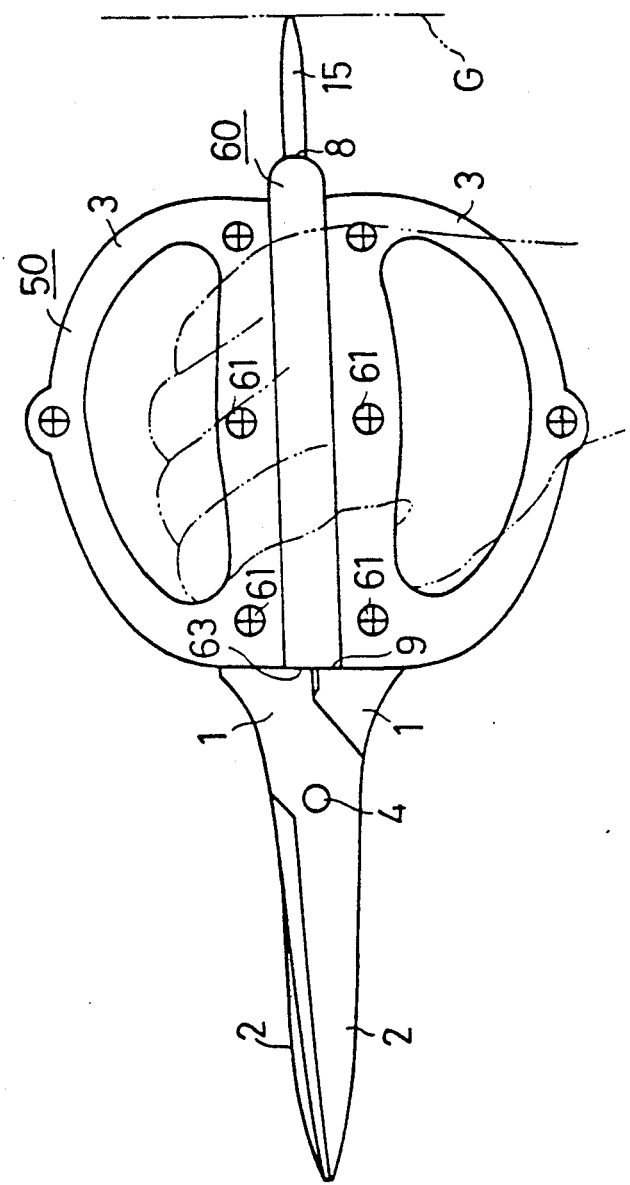
FIG. 6 is a front view of the emergency escape tool, showing how it may be gripped.

When a car accident happens, as shown in FIG. 6, the handles 3 are held to operate the blades 2 so as to cut a seat belt. Then, keeping a hold of the handles 3, the tip of the spike 15 is pressed against the window glass G in a right angle. As shown in FIG. 3, the handles 3 are moved toward the window glass G in the Y direction against the urging force of the compression spring 22. Accordingly, as shown in FIG. 4, the compression spring 22 is compressed, and the spike 15 and the pin 17 are moved inwardly in the handle 3. The pin 17, being oblique to the axial line of the punch 60, goes through the bore 14 and presses against the circumference of the opening portion of the passage 24. Thus, the pin 17 moves the weight 23 against the urging force of the compression spring 25, so that the force of the spring 25 is accumulated.

Figure 5:
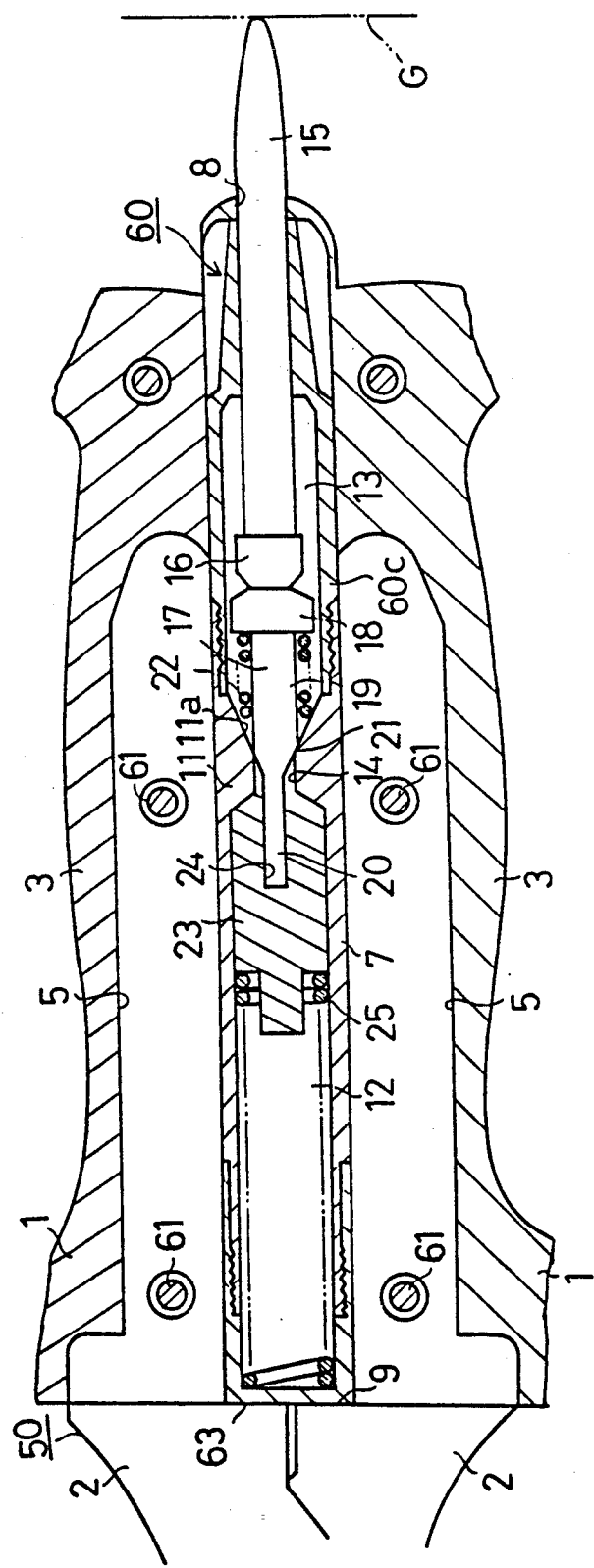
FIG. 5 is a plan sectional view of the emergency escape tool, showing another step of its operation.

As the pin 17 moves, the tapered surface 21 comes to contact with the guide surface 11a of the dividing wall 11, so that the shank 20 overlaps the opening of the passage 24. Simultaneously, the weight 23 promptly moves toward the distal end of the punch 60 according to the urging force of the compression spring 25 as shown in FIG. 5. Thus, the shank 20 is inserted into the passage 24 deeply. The spike 15 is hit by the pin 17 with a large force. Accordingly, the tip of the spike 15 gives a strong impulse to the window glass G, and the window glass G can be broken.

Then, the shank 20 is detached from the passage 24 according to the urging force of the compression spring 22. The tip of the spike 15 again protrudes from the handle 3 to the usual position shown in FIG. 3.

In the emergency escape tool of the present embodiment, the window glass G can be easily broken in a simple operation. That is, the tip of the spike 15 is brought into contact with the window glass G, and the handles 3 are pressed toward the window glass G. Thus, the window glass G can be broken even by a child or a person who has relatively poor physical strength even in an emergency situation in the water or the like. If the window glass G is broken by the punch 60, the broken fragments will not be scattered. Thus the tool is safe.

When the seat belt is cut, it is easily cut even in the emergency situation because the scissors 50 are easy to handle. Moreover, only one tool can both cut the seat belt and break the window, and the emergency escape tool of the present embodiment only requires one grip for both the purposes.

Figure 7:
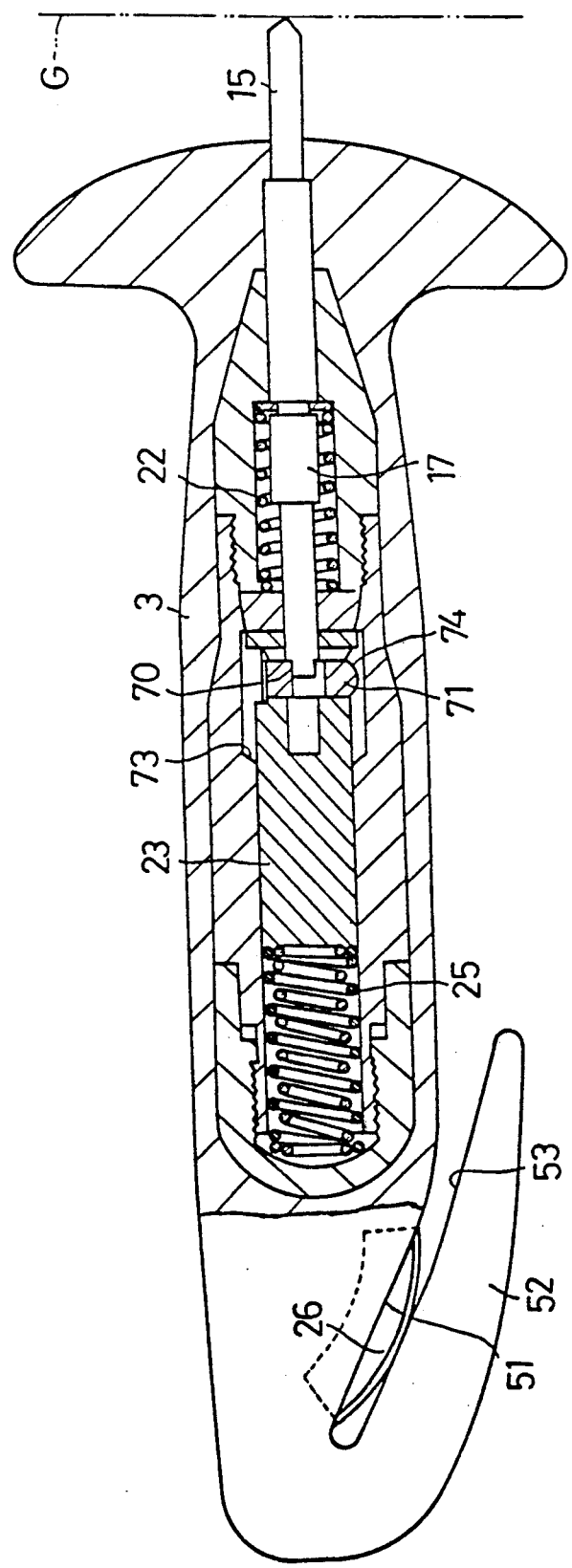
FIG. 7 is a plan view of an emergency escape tool of another embodiment, using a cutter instead of scissors.

Another embodiment of the present invention will be described in detail hereinafter according to FIG. 7. In this embodiment, the spike 15 and its force accumulating mechanism and hitting mechanism are made in the same way as the foregoing embodiment. In the present embodiment however, a cutter 26 is used as seat belt cutting means instead of the scissors. A tapered surface 51 is formed at a circumference of a cutting side end of a bar shape handle 3. A guide 52 is provided adjacent the tapered surface 51 at the proximal (left in FIG. 7) end thereof and extends in parallel with the tapered surface 51. A slit 53 is formed between the tapered surface 51 and the guide 52. An arcuate blade 54 is embedded in the tapered surface 51 and protrudes into the slit 53. A seat belt can be cut by being inserted into the slit 53 along the guide 52 and by pulling the handle 3 by means of the blade 54.

When the spike 15 is pressed against the window glass G, the pin 17 is moved toward the weight 23 against the urging force of the compression spring 22. A step 70 provided at an end of the pin 17 is engaged with an opening portion of a ring 71, so that the weight 23 is pushed by way of the ring 71. The weight 23 moves inwardly compressing the compression spring 25. When the weight 23 moves inwardly beyond a guide wall 73 of a chamber 72, a tapered surface 74 of the ring 71 is engaged with the guide wall 73, thus the ring 71 slides. Accordingly, the step 70 and the ring 71 are displaced relatively. Therefore, the pin 17 goes into the passage 24 of the weight 23 by way of a bore 75 of the ring 71.

Consequently, the weight 23 having an accumulated force promptly moves toward the protruding side, the end of the pin 17 is hit by a bottom surface of the passage 24, and the window glass can be broken in the same manner as the foregoing embodiment.

What is claimed is:

1. An emergency escape tool for use in escaping from an automobile at the time of an accident, said tool comprising:
    cutting means for cutting a seat belt of said automobile;
    a retractable spike protruding from a first end of said cutting means for pressing against a window glass of said automobile;
    driving means for forcing said spike in the direction of said first end to break the window; and
    handle means for controlling said cutting means to cut said seat belt and said retractable spike to break said window glass.

2. An emergency escape tool as set forth in claim 1, wherein said cutting means protrudes from a second end of the tool positioned opposite to said first end.

3. An emergency escape tool as set forth in claim 1, wherein said spike has an exposed end and retracted end and said driving means includes a pin engaging the retracted end of the spike for driving said spike.

4. An emergency escape tool as set forth in claim 3, wherein said driving means further includes a weight disposed at a position away from the pin, and a compressed spring for driving said weight in the direction of the first end.

5. An emergency escape tool as set forth in claim 4, wherein said weight includes:
- a guide passage having an opening on an end surface opposed to the pin and extending in the displacement direction of the pin; and
- guide means disposed at a position between the passage and the pin for bringing said pin into registration with the opening.

6. An emergency escape tool as set forth in claim 5, wherein said weight has a wall that engages the pin to drive the spike when the pin enters the passages.

7. An emergency escape tool as set forth in claim 1, wherein said driving means comprises;
- a pin engaging the retracted end of the spike for driving said spike;
- a weight disposed at a position away from the pin, and a compressed spring for driving said weight in the direction of the first end, said weight including a guide passage having an opening on an end surface opposed to the pin;
- guide means disposed at a position between the passage and the pin for bringing said pin into registration with the opening; and
- a wall formed on said weight and engaging the pin to drive the spike when the pin enters the passages.

8. An emergency escape tool as set forth in claim 1, wherein said cutting means is scissors.

9. An emergency escape tool as set forth in claim 1, wherein said cutting means is a cutter.

10. An emergency escape tool in use for escaping from an automobile at the time of an accident, said tool comprising:
- scissors for cutting a seat belt of said automobile, said scissors comprising a pair of scissor arms;
- a retractable spike protruding from a first end of one of said scissor arms of said scissors for pressing against a window glass of said automobile;
- a pin engaging the retracted end of the spike for driving said spike to break said window glass;
- a weight disposed at a position away from the pin, and a compressed spring for driving said weight in the direction of the first end, said weight including a guide passage having an opening on an end surface opposed to the pin;
- guide means disposed at a position between the passage and the pin for bringing said pin into registration with the opening;
- a wall formed on said weight for engaging the pin to drive the spike when the pin enters the passage; and
- handle means for controlling said scissors to cut said seat belt and said retractable spike to break said window glass.

* * * * *